Patented Mar. 10, 1931

1,795,364

UNITED STATES PATENT OFFICE

CARLETON ELLIS, OF MONTCLAIR, NEW JERSEY, ASSIGNOR TO ELLIS-FOSTER COMPANY, A CORPORATION OF NEW JERSEY

SULPHUR PRODUCT AND PROCESS OF MAKING SAME

No Drawing.    Application filed November 24, 1924.    Serial No. 751,868.

This invention relates to a sulphur product and to the process of making same and relates especially to an emulsion of sulphur or what may be termed suspensoid sulphur applicable to various industrial uses.

The invention is carried out by grinding or abrading sulphur with a silicious material such as hydrated silicate including clay, and especially the highly colloidal clay of the character of bentonite. The grinding or abrasion is carried out in the presence of water which may be neutral, acid or alkaline.

As an example 150 parts of sulphur, 50 parts of bentonite and 400 parts of water, proportions being by weight, are ground in a pebble mill for 6 hours. A suspension of sulphur of cream-like consistency is obtained which does not separate on standing even for a considerable period. This contains the sulphur in the form of extremely fine particles, in a condition approaching a colloidal suspension.

Preferably the grinding takes place in the cold but the same treatment or mechanical grinding and agitation in hot solution is not precluded. The employment of sulphur in its various forms such as flowers of sulphur, brimstone and crude sulphur, also in various allotropic forms such as plastic sulphur, is within the scope of the invention.

The emulsion or suspension of sulphur may be employed as obtained from the ball or pebble mill and in such form may be used to impregnate or coat various substances. For example it may be admixed with fillers such as asbestos fibre, wood flour, clay, whiting, marble dust, pigments, etc., dried and hot pressed to form shaped articles.

The emulsion or suspension may be mixed with for example cedar sawdust and the mixture dried and molded to make tablets or sheets which may be employed as moth eradicators. This might be considered as an artificial cedar board.

As noted above the grinding or agitation may take place in acid, neutral or alkaline solution depending upon the character of the product desired and whether or not other substances are being ground at the same time to form a mixture of dispersed products. Thus when casein is employed with sulphur the solution may be rendered alkaline with ammonia or caustic soda. When glue is employed acids may be used in some cases.

Ordinarily water alone suffices as the dispersing medium. If used in alkaline condition it is best to employ calcium or barium hydrates in preference to sodium or potassium hydrates for the reason that the former, on exposure to air, yield insoluble carbonates which serve as fillers, whereas the soda and potash carbonates are liable to have an undesirable action such as causing effluorescence, etc.

With the dispersion of sulphur there may be other substances present such as asphalt, coal tar, various natural resins or synthetic resins, the latter including for example resins obtained by reacting on a phenolic body such as phenol and its homologues with sulphur chloride. The sulphur resins so obtained are soluble in molten sulphur and considerably modify the properties of the sulphur, to some extent preventing prompt crystallization of the sulphur, when being cooled from the molten state.

There may also be additions such as soluble oils, soaps and immiscible solvent material. Also sulphonated oils, creosote, disinfecting solutions, etc. The cresote oils and sulphur may be employed to make an insecticidal spray or the dispersed sulphur solution may be employed as an insecticide without other addition.

Paper pulp may be admixed with the dispersion of sulphur, and heavy paper stock built up which is waterproofed by the intimate incorporation of sulphur or sulphur and asphalt etc.

A form of the present invention is a dry material made by grinding sulphur and bentonite in water, eliminating the water by drying at a temperature at which the sulphur does not sinter together. Under these conditions a powder is obtained which on stirring with water readily emulsifies yielding a dispersion of sulphur which may be employed as described above. Hence the present invention includes a sulphur and clay mixture in a dry form which readily becomes suspended, by mixing with water.

The proportions given above may be varied. The larger the proportion of bentonite the more readily the sulphur becomes dispersed when the dry mixture is stirred into water. On the other hand to secure a higher waterproofing effect it is best to reduce the bentonite to a minimum. This is aided by the addition of a small amount of an alkaline earth such as quick lime or barium oxide, 1 or 2 per cent sufficing.

Still another modification of the invention is that of incorporating the dispersion of sulphur (with or without filler) with rubber latex taking care that the latex is sufficiently alkaline with ammonia or other appropriate agent to avoid coagulation, drying this mixture and vulcanizing. In like manner a mixture of rubber latex and dispersed sulphur may be dried by spraying into a heated chamber, the mass of spray rubber thus obtained containing the sulphur intimately mixed therewith and serving as a vulcanizing agent. Accelerators, coloring agents and the usual additions of a rubber mix may be incorporated as desired.

A good dispersion of sulphur was obtained by grinding 90 parts by weight of sulphur and 10 parts of bentonite in 600 parts of water. To this mixture 1 per cent by weight of quick lime was introduced. The reduction of the proportion of bentonite with respect to sulphur to below 10 per cent of the latter is facilitated by the addition of quick lime and the like. Mixtures having a ratio of 95 parts of sulphur to 5 parts of bentonite may have above 1% of calcium or barium hydroxide.

The present invention embraces in one form the employment of dispersed sulphur or a mixture of dispersed sulphur and dispersed asphalt and the like as a means of waterproofing paper stock whereby there may be built up a thick layer of waterproof material, capable of being employed as a roofing shingle. The surface of the shingle may be coated with asbestos material or it may be impregnated with molten sulphur with or without a pigment, or molten sulphur may be applied to the surface as a cement for a thin layer of asbestos. The invention therefore includes a paper shingle waterproofed with sulphur, preferably dispersed sulphur, and also a duplex shingle composed of paper, waterproofed as above, surfaced with asbestos.

What I claim is:—

1. The process which consists in grinding sulphur with clay and water to form a dispersion, drying at a temperature below the sintering point of sulphur whereby a solid material is obtained capable of forming a dispersion of sulphur on stirring with water.

2. A sulphur clay mixture in dry form which can readily be dispersed in water.

3. A sulphur bentonite mixture in dry form which can readily be dispersed in water.

4. A molded article composed of a woody filler and suspensoid sulphur.

5. A hot pressed article comprising cedar sawdust bound together by sulphur previously in a dispersed state.

6. Cedar sawdust and suspensoid sulphur.

7. The process which consists in grinding sulphur with a hydrated argilaceous silicate in an alkaline aqueous medium.

8. The process which consists in grinding sulphur with a hydrated argilaceous silicate in an alkaline aqueous medium, and drying the same.

9. The process of grinding sulphur, bentonite and water together until a cream-like suspension is obtained, and drying the same.

10. A dry intimate mixture of sulphur and bentonite which when stirred up in water, becomes transformed into a smooth creamy suspension which is suitable for mixing with a filler to form a plastic.

11. A dry intimate mixture of sulphur and bentonite and an alkaline material which mixture when stirred up in water, becomes transformed into a smooth creamy suspension which is suitable for mixing with a filler to form a plastic.

12. A dry sulphur bentonite mixture containing the sulphur and bentonite in the form of extremely minute particles readily suspendable in water, and in proportion to give a high water proofing effect in an article containing same, together with a filler.

13. A dry sulphur bentonite mixture in which the sulphur and bentonite are in the form of very minute particles, readily suspendable in water, said mixture also containing an alkali.

14. A dry sulphur bentonite mixture in which the sulphur and bentonite are in the form of very minute particles, readily suspendable in water, said mixture also containing an alkaline earth.

15. A dry sulphur bentonite mixture in which the sulphur and bentonite are in the form of very minute particles, readily suspendable in water, said mixture containing 90 parts sulphur, about 10 parts bentonite and about 1% quick lime.

16. A dry sulphur bentonite mixture in which the sulphur and bentonite are in the form of a very minute particles, readily suspendable in water, said mixture containing 90 parts sulphur, and about 10 parts bentonite.

CARLETON ELLIS.